US012181823B2

(12) United States Patent
Asaka et al.

(10) Patent No.: US 12,181,823 B2
(45) Date of Patent: Dec. 31, 2024

(54) FIXING FILM, HEAT FIXING APPARATUS, AND ELECTROPHOTOGRAPHIC IMAGE FORMING APPARATUS

(71) Applicant: CANON KABUSHIKI KAISHA, Tokyo (JP)

(72) Inventors: Akeshi Asaka, Chiba (JP); Ryunosuke Kawahara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 18/334,465

(22) Filed: Jun. 14, 2023

(65) Prior Publication Data

US 2024/0045359 A1 Feb. 8, 2024

(30) Foreign Application Priority Data

Jun. 21, 2022 (JP) ................................ 2022-099830
Jun. 13, 2023 (JP) ................................ 2023-096734

(51) Int. Cl.
G03G 15/20 (2006.01)

(52) U.S. Cl.
CPC ................................ G03G 15/2057 (2013.01)

(58) Field of Classification Search
CPC ................................................. G03G 15/2057
See application file for complete search history.

(56) References Cited

U.S. PATENT DOCUMENTS 8,086,160 B2 12/2011 Nishizawa et al.
8,801,883 B2 8/2014 Fukumoto et al.
9,164,450 B2 10/2015 Matsumoto et al.
9,354,571 B2 5/2016 Miura et al.
9,701,053 B2 7/2017 Asaka et al.
10,859,955 B2 12/2020 Asaka et al.
2008/0112738 A1 5/2008 Yoshino et al.
2013/0322938 A1 12/2013 Suzuki et al.
2015/0241825 A1 8/2015 Miura et al.
2022/0206419 A1* 6/2022 Muramatsu ............... B32B 1/08
2023/0051709 A1* 2/2023 Asaka ................. G03G 15/206

FOREIGN PATENT DOCUMENTS

JP 2009-25612 A 2/2009
JP 2010-143118 A 7/2010
JP 2011-197507 A 10/2011
JP 2012-68578 A 4/2012
JP 2022-103065 A 7/2022
WO 2014/065219 A1 5/2014

OTHER PUBLICATIONS

Extended European Search Report in European Application No. 23180261.2 (Oct. 2023).

* cited by examiner

Primary Examiner — Stephanie E Bloss
Assistant Examiner — Michael A Harrison
(74) Attorney, Agent, or Firm — Venable LLP

(57) ABSTRACT

A fixing film having an endless shape, comprising at least a base material, an elastic layer, and a release layer in this order, the release layer comprising a tube containing a fluorine resin, and a value of Xe to Xm is 1.20 or more, where when, in a chart of an X-ray diffraction peaks obtained by measuring the release layer with a reflection X-ray diffraction method, a maximum X-ray diffraction strength at 2θ=17 to 19° is defined as Ic, a maximum X-ray diffraction strength at 2θ=39.5 to 40.5° is defined as Ia, and a value of Ic/Ia is defined as X, Xe represents an average value of X in an edge region, and Xm represents an average value of X in a central region.

18 Claims, 5 Drawing Sheets

FIXING FILM, HEAT FIXING APPARATUS, AND ELECTROPHOTOGRAPHIC IMAGE FORMING APPARATUS

BACKGROUND OF THE INVENTION

Field of the Invention

The present disclosure relates to a fixing film for use in an electrophotographic image forming apparatus, a heat fixing apparatus, and an electrophotographic image forming apparatus.

Description of the Related Art

An electrophotographic image forming apparatus includes a fixing apparatus for heating and pressurizing a toner image formed on a recording material such as paper (which may be hereinafter described as a "sheet"), and thereby fixing the toner image on the sheet. The fixing apparatus includes fixing members such as a heat roller (heating film) and a pressure roller (pressure film), and performs a fixing treatment of the unfixed toner image on the sheet at a position (fixing nip part) at which the heat roller and the pressure roller are in pressure contact with each other.

Examples of the fixing apparatus include a film heating type apparatus. The apparatus has a heater as a heating member (heating source) having a resistive heat generator on a substrate made of ceramics. The apparatus has an endless fixing film as a heating member travelling rotatively while including a heater therein and being in contact with the heater. The apparatus has a pressure roller (pressurizing rotating member) as a nip part forming member for forming a nip part by coming in pressure contact with the fixing film, and rotatively driving the fixing film.

The film heating system enables a lower heat capacity and a smaller size of the fixing film, and hence can implement energy saving of the fixing apparatus. Further, it becomes possible to shorten the time (warm-up time) taken until the temperature of the fixing film reaches a prescribed temperature enough to heat and fix a toner image.

For the film-shaped base material, a resin such as polyimide or a metal such as nickel or a stainless steel is used. On such a base material, an elastic layer including rubber excellent in heat resistance such as silicone rubber is provided. Due to the presence of the elastic layer, when a sheet onto which a toner has been transferred passes through the nip part, the flexibility of the elastic layer deforms the surface of the fixing member, which well follows the unfixed toner image on the sheet, resulting in an increase in contact area between the fixing member and the unfixed toner image on the sheet. For this reason, the unfixed toner image can be more uniformly molten, and can be fixed on the sheet. As a result, a high quality electrophotographic image can be obtained.

Then, on the elastic layer, a release layer is provided for imparting the releasability with respect to the toner of the fixing member. As the materials forming the release layer, fluorine resins such as polytetrafluoroethylene (PTFE), tetrafluoroethylene/perfluoroalkyl vinyl ether copolymer (PFA), and tetrafluoroethylene/hexafluoropropylene copolymer (FEP) are used.

As the method for forming the release layer on the elastic layer, the following method is known: the surface of the elastic layer is covered with a tube including a fluorine resin previously manufactured by extrusion (which will be also hereinafter referred to as a "fluorine resin tube"). Incidentally, for the fluorine resin tube, molecules of the fluorine resin are oriented along the extrusion direction. As a result, the fluorine resin tube tends to be torn in the orientation direction of the molecular chain, namely, in the direction in parallel with the extrusion direction.

Japanese Patent Application Publication No. 2011-197507 discloses as follows: a thermally contractible tube obtained by extending the diameter of a PFA tube is heated and contracted to be allowed to melt-adhere to and integrated with a rubber roller, thereby forming a PFA layer on the outer circumferential surface of the rubber roller; then, the PFA is reheated to a temperature equal to, or higher than the melting point of the PFA contained in the PFA tube, thereby relaxing and removing the internal stress of the PFA layer formed from the PFA tube after thermal contraction; as a result, breakage of the PFA layer in the direction along the rotational axis of a roller or a belt is prevented.

SUMMARY OF THE INVENTION

At least one aspect of the present disclosure is directed to providing a fixing film which includes a surface layer exhibiting the tear resistance in the direction along the rotational axis, and the wear resistance of the edge region on each opposite side in the direction along the rotational axis at a higher level even by long-term use. Further, at least one aspect of the present disclosure is directed to providing a heat fixing apparatus which contributes to the stable formation of a high quality electrophotographic image. Still further, at least one aspect of the present disclosure is directed to providing an electrophotographic image forming apparatus which can form a high quality electrophotographic image with stability. Furthermore, at least one aspect of the present disclosure is directed to providing a manufacturing method of a fixing film including a surface layer exhibiting the tear resistance in the direction along the rotational axis, and the wear resistance of the edge region on each opposite side in the direction along the rotational axis at a higher level even by long-term use.

According to at least one aspect of the present disclosure, there is provided a fixing film having an endless shape, wherein

- the fixing film comprises at least a base material, an elastic layer, and a release layer in this order,
- the release layer comprises a tube containing a fluorine resin, and
- a value of Xe/Xm is 1.20 or more, where
- when,
- in a chart of an X-ray diffraction peaks obtained by measuring the release layer with a reflection X-ray diffraction method, a maximum X-ray diffraction strength at $2\theta=17$ to $19°$ is defined as Ic, a maximum X-ray diffraction strength at $2\theta=39.5$ to $40.5°$ is defined as Ia, and a value of Ic/Ia is defined as X, and
- a length in a direction along a rotational axis of the fixing film is defined as L,
- Xe represents an average value of the X in an edge region up to 0.15 L from each opposite edge in the direction along the rotational axis of the fixing film, and
- Xm represents an average value of the X in a central region with a length in the direction along the rotational axis of 0.70 L present between the two edge regions.

According to at least one aspect of the present disclosure, there is provided a heat fixing apparatus comprising the fixing film described above.

According to at least one aspect of the present disclosure, there is provided an electrophotographic image forming apparatus comprising the heat fixing apparatus described above.

According to at least one aspect of the present disclosure, there is provided a method for manufacturing the fixing film described above, comprising:

(i) preparing a fluorine resin tube of a cylindrically extruded product of a resin mixture comprising a fluorine resin;

(ii) covering an outer surface of the elastic layer of the base material with the fluorine resin tube; and (iii) subjecting a region corresponding to the central region of the fluorine resin tube to a heat treatment at a temperature equal to or higher than a melting temperature of the fluorine resin, and subjecting a region corresponding to the edge region to a heat treatment at a temperature of not exceeding the melting temperature of the fluorine resin.

Further features of the present disclosure will become apparent from the following description of exemplary embodiments with reference to the attached drawings.

DESCRIPTION OF THE EMBODIMENTS

Figure 1:
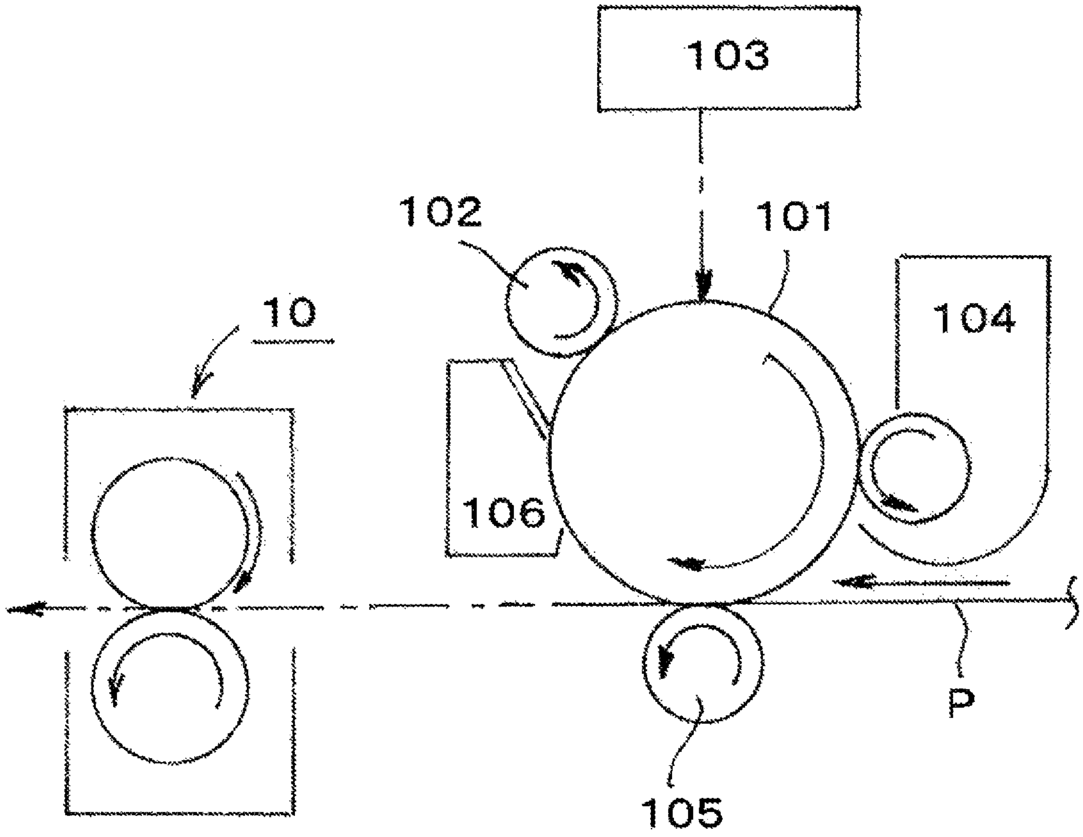
FIG. 1 is a schematic block view of one example of an electrophotographic image forming apparatus

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily.

According to a study by the present inventors, it has been indicated as follows: the PFA layer whose internal stress has been released by the method disclosed in Japanese Patent Application Publication No. 2011-197507 is relaxed in molecular orientation in the extrusion direction (the direction along the rotational axis) included by the PFA tube, and becomes less likely to be torn in the direction along the rotational axis. Herein, as disclosed in Japanese Patent Application Publication No. 2010-143118, the degree of orientation and the degree of crystallinity of a fluorine resin are correlated with each other. For this reason, a fluorine resin tube with a high degree of orientation of the molecules in the direction along the rotational axis is also high in crystallinity, and has an excellent wear resistance. Therefore, the fluorine resin tube relaxed in molecular orientation of a fluorine resin in the direction along the rotational axis by the method disclosed in Japanese Patent Application Publication No. 2011-197507 is also reduced in wear resistance.

To meet a recent demand for a still longer life for an electrophotographic image forming apparatus, a fixing film has also been demanded to be improved in durability. Then, the edge region on each opposite side in the direction along the rotational axis of the fixing film is the segment with which the edge of paper repeatedly comes in contact, and hence is required to have a particularly high wear resistance.

The present inventors conducted a close study thereon, and as a result, they found the following: the orientation state of the molecules of the fluorine resin in the release layer is varied between in the central region in the direction along the rotational axis of the fixing film roughly corresponding to the image formation region of a recording material (which will be also hereinafter referred to as a "longitudinal direction"), and in the edge region on each opposite side in the direction along the axis roughly corresponding to the region with which the edge of the recording material comes in contact; as a result, the tear resistance and the wear resistance can be made compatible with each other at a higher level.

Namely, a fixing film in accordance with at least one aspect of the present disclosure has at least a base material, an elastic layer, and a release layer in this order.

The release layer includes a tube including a fluorine resin (which will be also hereinafter referred to as a "fluorine resin tube").

Then, a value (Xe/Xm) of a ratio of Xe to Xm is 1.20 or more, where

X represents a value (Ic/Ia) of a ratio of a maximum X-ray diffraction strength Ic at 2θ=17 to 19° to a maximum X-ray diffraction strength Ia at 2θ=39.5 to 40.5° with a reflection X-ray diffraction method of the release layer, L represents a length in the direction along the rotational axis of the fixing film, Xe represents an average value of the X in a region up to 0.15 L from both edges in the direction along the rotational axis of the fixing film (which will be also hereinafter referred to as an "edge region"), and Xm represents an average value of the X in a region with a length of 0.70 L of the central part in the direction along the rotational axis present between the two edge regions up to 0.15 L from both the edges of the fixing film (which will also be hereinafter referred to as a "central region").

The maximum peak observed in the region of 2θ=17 to 19° in the chart of the X-ray diffraction peaks obtained by measuring the fluorine resin tube with the reflection X-ray diffraction method is considered to be the diffraction peak of the α type crystal (100) plane by the fluorine resin in the fluorine resin tube. Further, in the chart, the halo pattern observed in the region of 2θ=30 to 50° is considered to be derived from the amorphous component of the fluorine resin in the fluorine resin tube.

Thus, in the present disclosure, Ia represents the maximum X-ray diffraction strength at 2θ=39.5 to 40.5° of the amorphous halo peaks in the chart. Whereas, Ic represents the maximum X-ray diffraction strength of the diffraction peaks derived from the α type crystal (100) plane of the fluorine resin at 2θ=17 to 19° in the chart. Then, as the parameter indicative of the degree of development of crystallization in the fluorine resin tube, a value (X) of the ratio (Ic/Ia) of Ic to Ia is set.

Incidentally, for Ic and Ia, the values obtained by deducting the X-ray diffraction strength at 2θ=59 to 60° as the reference is assumed to be used in order to eliminate the influence of the base line.

For the fluorine resin tube in accordance with one aspect of the present disclosure, the ratio (Xe/Xm) of X in the edge region, namely, Xe, to X in the central region, namely, Xm is 1.20 or more. In other words, for the fluorine resin tube, the degree of development of crystallization of the fluorine resin in the edge region is higher than the degree of development of crystallization of the fluorine resin in the central region. This indicates that the fluorine resin tube in accordance with the present disclosure is less likely to be torn in the direction along the rotational axis even by long-term use in the central region. Further, the fluorine resin tube has a high wear resistance in the edge region that tends to come in contact with the edge portion of paper. As a result, the fixing film in accordance with at least one aspect of the present disclosure combines the tear resistance in the direction along the rotational axis and the wear resistance of the edge region on each opposite side in the direction along the rotational axis at a higher level even by long-term use.

Below, embodiments of the present disclosure will be described in details by reference to the accompanying drawings.

Electrophotographic Image Forming Apparatus (Image Forming Apparatus)

FIG. 1 is a schematic block view of one example of an electrophotographic image forming apparatus (which will be also hereinafter referred to as an image forming apparatus). The image forming apparatus is an image forming apparatus of an electrophotographic system, and has a rotating electrophotographic photosensitive body 101. The image forming apparatus has a charging device 102, and an image exposure means 103 as electrostatic latent image forming means with respect to the photosensitive body 101, and a developing means 104 for developing the electrostatic latent image on the photosensitive body 101 as a toner image (developer image). Further, the image forming apparatus has a transfer means 105 for transferring the toner image on the photosensitive body 101 onto a sheet-shaped recording material (which will be hereinafter described as paper or sheet) P. The image forming apparatus has a cleaning means 106 for cleaning the photosensitive body 101 surface after toner image transfer, a heat fixing apparatus (fixing apparatus) 10 (FIG. 2) as a fixing means for fixing a toner image T on the sheet P, and the like.

Heat Fixing Apparatus (Fixing Apparatus)

Figure 2:
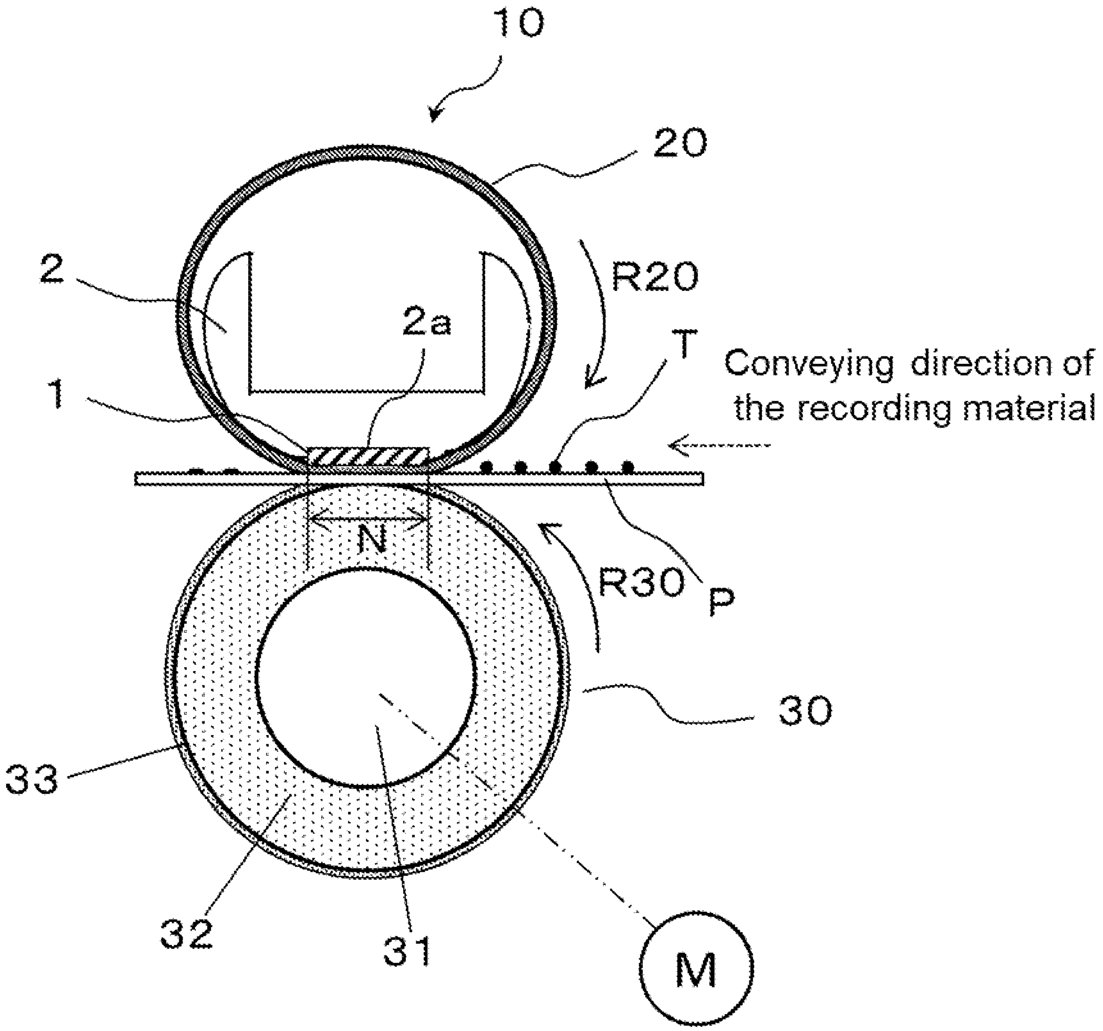
FIG. 2 is a schematic cross sectional view showing a configuration of a fixing apparatus in accordance with the present embodiment

FIG. 2 is a transverse cross sectional schematic view showing a schematic configuration of a fixing apparatus 10 in the present embodiment. In the following description, regarding a fixing apparatus and the members configuring the fixing apparatus, the direction along the rotational axis is the direction orthogonal to the transport direction of paper on the plane of paper. The length is the dimension in the direction along the rotational axis. The direction along the rotational axis of the fixing film is also similarly the direction orthogonal to the paper transport direction, and is the direction perpendicular with respect to the surface on which a fixing film 20 is drawn in FIG. 2 (the direction perpendicular to the drawing).

The fixing apparatus 10 is a fixing apparatus of a belt (film) heating system. The fixing apparatus 10 includes a ceramics heater (which will be hereinafter described as a heater) as a heating body, and a film guide 2 also serving as a heating body support member. Further, the fixing apparatus 10 includes a fixing film 20 which is in an endless shape (cylindrical shape), and flexible and heat resistant as a heating member (fixing member). Further, the fixing apparatus 10 includes a pressure roller 30 as a nip part forming member for forming a nip part (fixing nip part) N by coming in pressure contact with the fixing film 20.

The heater 1 is a sheet-shaped member elongated along the longitudinal direction of the fixing film 20 (the direction perpendicular to the drawing), and has a heat source such as a resistive heat generator for generating heat by passage of an electric current by a feeding means not shown, and is rapidly increased in temperature by feeding. The temperature of the heater 1 is detected by a temperature detecting means not shown. The detected temperature information is inputted to a control means not shown. The control means controls the power supply from the feeding means to the heat source so that the detected temperature inputted from the temperature detecting means may be kept at a prescribed fixation temperature, and adjusts the temperature of the heater 1 at a prescribed temperature.

The heater 1 is supported by a film guide 2 formed in a substantially semi-circular arc-shaped gutter type in transverse cross section with a heat resistant material having a rigidity. More specifically, the outer surface of the film guide 2 is provided with a groove part 2*a* along the guide longitudinal direction, and the heater 1 is fitted into the groove part 2*a*.

Figure 3:
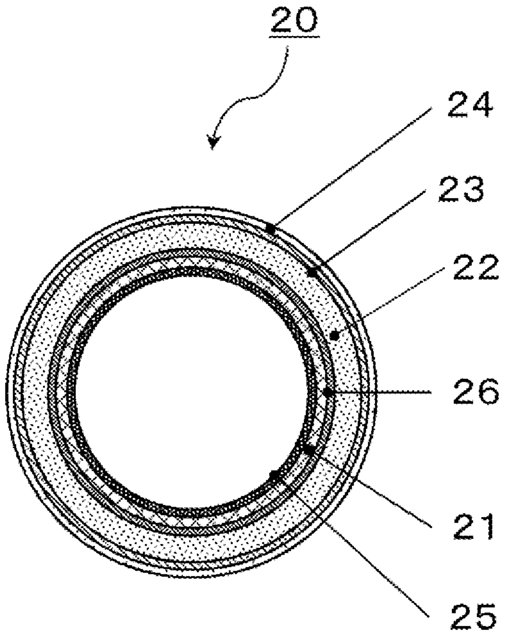
FIG. 3 is a schematic cross sectional view of a fixing film in accordance with the present embodiment

As described later, the fixing film 20 includes at least a ring-shaped (tubular) base material 21, elastic layer 22, release layer 24, and the like in this order from inward to outward (FIG. 3). As shown in FIG. 3, the fixing film 20 may further have other layers such as an inner surface sliding layer 25 and a primer layer 26. The fixing film 20 is an endless film whose inner circumferential surface is rubbed by the heater 1 and the film guide 2 in use, and is fitted around the outer circumference of the film guide 2 supporting the heater 1 with a margin allowed for the circumference.

The heater 1 and the pressure roller 30 are in pressure contact with each other with the fixing film 20 interposed therebetween, and the nip part N is formed between the fixing film 20 and the pressure roller 30. The pressure roller 30 is rotatively driven in the counterclockwise direction indicated with an arrow R30 at a prescribed peripheral velocity by a rotatively driving device M such as a motor. Following the rotational driving of the pressure roller 30, the fixing film 20 rotates in the clockwise direction of an arrow R20 around the outer circumference of the film guide 2 with its inner surface sliding in intimate contact with the surface of the heater 1. The edge on each opposite side in the direction along the rotational axis of the fixing film 20 is rotatably supported by a flange (not shown) of a regulating member fixed to the fixing apparatus 10.

The film guide 2 functions as the support member of the heater 1, and also functions as the rotation guide member of the fixing film 20. A lubricant (grease) is coated on the inner circumferential surface of the fixing film 20 in order to ensure the slidability with the heater 1 and the film guide 2.

The pressure roller 30 includes a substrate 31 in a solid round bar shape, a cylindrical shape (pipe shape), or another shape, an elastic layer 32, and a release layer 33 from inward to outward. The pressure roller 30 is rotatively driven in use by a rotatively driving device M such as a motor. For this reason, the edge on each opposite side in the direction along the rotational axis of the substrate 31 is rotatably supported at a fixing part not shown of the frame of the fixing apparatus 10, or the like via a bearing member.

Further, the pressure roller 30 is arranged at a position opposed to the heater 1 supported by the film guide 2 across the fixing film 20. Then, a pressurizing mechanism (not shown) applies a prescribed pressure to the pressure roller 30 and the fixing film 20. As a result, the pressure roller 30 and the fixing film 20 are in pressure contact with each other, so that respective elastic layers (22, 32) are elastically deformed. As a result of this, the nip part N with a prescribed width in the sheet transport direction is formed between the pressure roller 30 and the fixing film 20.

Pressure contact between both of the fixing film 20 as a heating member and the pressure roller 30 as a nip forming member may be accomplished by a configuration in which the pressure roller 30 is brought into pressure contact with the fixing film 20 under a prescribed pressure, or a configuration in which the fixing film 20 side is brought into pressure contact with the pressure roller 30. Alternatively, a still other configuration is also acceptable in which both of the fixing film 20 side and the pressure roller 30 are brought into pressure contact with each other under a prescribed pressure.

When the pressure roller 30 is rotatively driven by the rotatively driving device M, the pressure roller 30 transports the sheet P while sandwiching the sheet P at the nip part N between it and the drivenly rotating fixing film 20. Further, the fixing film 20 is heated by the heater 1 until the temperature of the surface thereof reaches a prescribed temperature (e.g., 200° C.). In this state, the sheet P carrying an unfixed toner image T is introduced to the nip part N, and is sandwiched and transported. As a result, the unfixed toner T on the sheet P is heated and pressurized. Then, the unfixed toner T is molten/color mixed. For this reason, subsequently, by cooling this, the toner image is fixed on the sheet P as a fixed image.

Fixing Film

Then, the fixing film 20 in the present Example will be described in details.

FIG. 3 is a cross sectional schematic view showing the layer configuration of the fixing film 20. A reference No. 21 represents the base material (cylindrical substrate) of the fixing film 20, a reference No. 25 represents an inner surface sliding layer arranged on the inner circumferential surface of the base material 21, a reference No. 26 represents a primer layer covering the outer circumferential surface of the base material 21, and a reference No. 22 represents an elastic layer arranged on the primer layer 26. A reference No. 24 represents a fluorine resin tube as a release layer, and a reference No. 23 represents an adhesive layer for fixing the release layer 24 on the elastic layer 22.

Below, respective constituent layers will be specifically described.

(3-1) Base Material 21

The base material 21 of the fixing film 20 has an endless shape. Then, in view of the fact that the base material 21 is required to have a heat resistance and a flex resistance, also in consideration of the heat resistant resins such as polyimide, polyamideimide, and polyether ether ketone (PEEK), and the thermal conductivity, a metal such as a stainless steel (SUS), nickel, or a nickel alloy having a higher thermal conductivity than that of the heat resistance resin is preferably used. The base material 21 is required to be increased in mechanical strength while being reduced in heat capacity. For this reason, the thickness is desirably set at 5 to 100 μm, and preferably set at 20 to 85 μm.

(3-2) Inner Surface Sliding Layer 25

The fixing film 20 may include the inner surface sliding layer 25 on the inner circumferential surface side of the base material 21.

As the inner surface sliding layer 25, a resin having both high durability and high heat resistance such as a polyimide resin is suitable. In the present Example, a polyimide precursor solution obtained by effecting the reaction between aromatic tetracarboxylic acid dianhydride or a derivative thereof and aromatic diamine in substantially equal moles in an organic polar solvent is coated on the inner circumferential surface of the base material 21, and the solvent is dried, followed by heating, thereby effecting the dehydration ring closure reaction (imidization reaction). As a result, the inner surface sliding layer 25 is formed. The inner surface sliding layer 25 is gradually worn away by rubbing with the heater 1. Accordingly, the inner surface sliding layer 25 is preferably provided with a thickness enough to allow action as the sliding layer through endurable use. On the other hand, when the thickness is set too large, the inner surface sliding layer 25 acts as a heat resistant layer for hindering heat supply from the heater 1. For this reason, the thickness is preferably 5 to 20 μm, and more preferably 10 to 15 μm.

(3-3) Elastic Layer 22

The outer circumferential surface of the base material 21 is provided with the elastic layer 22 via the primer layer 26. The elastic layer 22 uniformly gives a heat to the unfixed toner T in such a manner as to encompass the unfixed toner T on the sheet P when the sheet P passes through the nip part N. The elastic layer 22 functions in this manner, resulting in a good-quality image with a high gloss and without uneven fixing.

The materials for the primer layer 26 have no particular restriction, and known ones can be used. Examples thereof may include "DY39-051 A/B" (tradename) manufactured by DOW and TORAY Co. The thickness of the primer layer 26 has no particular restriction, and is, for example, 0.1 to 5 μm. The method for forming the primer layer 26 also has no particular restriction. Examples thereof may include spray coating and immersion coating.

The materials for the elastic layer 22 have no particular restriction, and known ones can be used. Because of the reasons that processing is easy, processing can be performed with a high dimensional precision, and a reaction by-product is not generated at the time of heating and curing and other reasons, a cured product of an addition reaction crosslinking type liquid silicone rubber is preferable. The addition reaction crosslinking type liquid silicone rubber may include, for example, organopolysiloxane and organohydrogen polysiloxane, and may further include a catalyst and other additives. Organopolysiloxane is a base polymer including silicone rubber as the raw material, and the one having a number average molecular weight of 5,000 to 100,000, and a weight-average molecular weight of 10,000 to 500,000 may be desirably used.

Liquid silicone rubber is a polymer having flowability at room temperature, and is cured by heating, has an appropriately low hardness after curing, and has sufficient heat resistance and deformation recovery force. For this reason, the liquid silicone rubber is preferably used not only for a belt elastic layer 22 but also for an elastic layer 32 of the pressure roller 30 described later.

Incidentally, when the elastic layer 22 is formed of a silicone rubber simple substance, the thermal conductivity of the elastic layer 22 is reduced. Preferably, the thermal conductivity of the elastic layer 22 is increased, which makes the heat generated at the heater 1 more likely to be transferred to the sheet P via the fixing film 20, and heating is sufficiently performed for fixing the toner on the sheet P, thereby suppressing an image defect such as uneven fixing. Thus, in order to increase the thermal conductivity of the elastic layer 22, for example, a granular highly thermally conductive filler having a high thermal conductivity is preferably mixed and dispersed in the elastic layer 22.

As the granular highly thermally conductive filler, at least one selected from the group consisting of silicon carbide (SiC), zinc oxide (ZnO), alumina ($Al_2O_3$), aluminum nitride (AlN), magnesium oxide (MgO), carbon, and the like is used. These can be used alone, or in mixture of two or more thereof.

The average particle diameter of the highly thermally conductive filler is preferably from 1 μm to 50 μm for handling, and from the viewpoint of the dispersibility. Further, for the shape, a spherical shape, a pulverized shape, a needle-shape, a sheet shape, a whisker shape, or the like is used. From the viewpoint of the dispersibility, a spherical shape is preferable. The thickness of the elastic layer 22 is preferably 30 to 500 μm, and more preferably 100 to 300 μm in order to obtain a good quality image due to sufficient elasticity, and in order to make favorable the time required for the temperature to reach a prescribed temperature by heating due to the heat capacity.

(3-4) Adhesive Layer 23

On a cured silicone rubber of the elastic layer 22, the adhesive layer 23 for fixing the fluorine resin tube of the release layer 24 is formed. The adhesive layer 23 can be formed by, for example, coating an adhesive with a thickness of 1 to 10 μm on the surface of the elastic layer 22, or other processes (an adhesive coating step of coating an adhesive on the outer circumferential surface of the cylindrical elastic layer).

Examples of the adhesive layer 23 may include a cured product of an addition curable silicone rubber adhesive. The addition curable silicone rubber adhesive 23 includes an addition curable silicone rubber mixed with a self-adhesive component. Specifically, the addition curable silicone rubber adhesive 23 includes organopolysiloxane having an unsaturated hydrocarbon group represented by a vinyl group, hydrogen organopolysiloxane, and a platinum compound as a crosslinkable catalyst. Then, curing is effected by the addition reaction.

The adhesive for use in the adhesive layer 23 has no particular restriction, and may only be selected in consideration of the materials for the elastic layer and the release layer. Known ones can be used.

(3-5) Release Layer 24

The release layer includes a fluorine resin tube. The fluorine resin tube is preferably, for example, a cylindrically extruded product. For the release layer of the surface layer of a fixing member, for example, a fluorine resin tube by extrusion is used from the viewpoint of the moldability and the toner releasability. As the fluorine resin, a tetrafluoroethylene/perfluoroalkyl vinyl ether copolymer (PFA) excellent in heat resistance is preferably used. For example, the release layer is preferably an extruded tetrafluoroethylene/perfluoroalkyl vinyl ether copolymer (PFA tube).

The form of copolymerization of PFA serving as the raw material has no particular restriction. Examples thereof may include random copolymerization, block copolymerization, and graft copolymerization. Further, the content molar ratios of tetrafluoroethylene (TFE) and perfluoroalkyl vinyl ether (PAVE) in PFA serving as the raw materials have no particular restriction. For example, the one with a content molar ratio of TFE/PAVE of 94/6 to 99/1 can be preferably used.

Other than PFA, as a fluorine resin, mention may be made of a tetrafluoroethylene/hexafluoropropylene copolymer (FEP), polytetrafluoroethylene (PTFE), or an ethylene/tetrafluoroethylene copolymer (ETFE). Further, mention may be made of polychlorotrifluoroethylene (PCTFE), an ethylene/chlorotrifluoroethylene copolymer (ECTFE), polyvinylidene fluoride (PVDF), and the like. Then, the fluorine resins can be used alone singly, or in combination of a plurality thereof.

The thickness of the release layer 24 is preferably set at 10 μm or more in order to keep the function as the release layer through endurance in consideration of the wear by rubbing with the sheet. On the other hand, when the thickness is set too large, the reduction of the thermal efficiency arising from an increase in thermal resistance, and an increase in contact thermal resistance with the sheet arising from the lack of the flexibility cause the reduction of the energy saving performance and the image quality. Accordingly, the thickness is desirably 45 μm or less. For example, the thickness of the release layer is preferably 10 to 45 μm, 10 to 40 μm, or 15 to 40 μm.

In the present Example described later, as a fluorine resin tube, a tube including PFA with a thickness of 15 to 40 μm manufactured by extrusion (which will be hereinafter also referred to as a "PFA tube") was used. The inner surface of the PFA tube is preferably previously subjected to a sodium treatment, an excimer laser treatment, an ammonia treatment, or the like. This is because the wettability with the addition curable silicone rubber adhesive and the adhesion after curing can be improved.

The release layer 24 is formed by covering the top of the outer circumferential surface of the elastic layer 22 coated with the addition curable silicone rubber adhesive 23 with a PFA tube by a known technology. In Example described later, the method in which the PFA tube is vacuum extended externally for covering (vacuum extension covering method) was used.

The excess addition curable silicone rubber adhesive 23 not contributing to adhesion, and air sucked upon tube covering are present between the PFA tube after covering and the elastic layer 22. In order to squeeze out the excess adhesive 23 and the air, using the method in which a ring-shaped nozzle slightly larger than the outer diameter of the fixing film is moved in the longitudinal direction of the fixing film while emitting an air from the nozzle, thereby squeezing out them, the method for squeezing out them using an O ring smaller than the outer diameter of the fixing film, or another method, the excess adhesive 23 and the air are removed.

Then, heating is performed for a prescribed time by a heating means such as an electric furnace, thereby curing/bonding the addition curable silicone rubber adhesive 23, and cutting both edges to a desirable length. As a result, a fixing film can be obtained.

For the fixing film in accordance with one aspect of the present disclosure, the crystal orientation state of the release layer 24 is varied according to the position in the direction along the rotational axis. One example of a specific manufacturing method of such a fixing film will be described. For the heat treatment of the release layer (fluorine resin tube), an erect type and cylindrical heating cylinder capable of heating to a temperature of 330° C. or more is used for heating the entire region of the fixing film. In Example described later, a heating cylinder with an inner diameter of 42 mm was used according to the outer diameter of the fixing film of 24.7 mm. The inner surface of the heating cylinder has been subjected to heat resistant black coating.

Further, band heaters are set dividedly at at least 3 sites of upper, middle, and lower parts of the heating cylinder so as to perform control by changing the heating temperature according to the position in the direction along the axis of the fixing film. A thermocouple capable of independently controlling the temperature is mounted at each band heater. As a result of this, a heat treatment is performed by controlling the heating temperature to a different temperature according to the direction along the axis of the fixing film, thereby varying the crystal orientation state of the release layer 24 between in the regions corresponding to the edge regions on both sides in the direction along the axis, and in the region corresponding to the central region. For the fluorine resin tube of the cylindrically extruded product of a resin mixture including a fluorine resin, the molecules of the fluorine resin are oriented in the extrusion direction. Therefore, regarding the fixing film obtained by covering the elastic layer with the fluorine resin tube, in the release layer including the fluorine resin tube, the molecules of the fluorine resin are oriented in the direction along the rotational axis of the fixing film.

Such a fluorine resin tube is preferably heated at a temperature of not exceeding the melting temperature of a fluorine resin, for example, for the regions corresponding to the edge regions each up to 0.15 L from the edges on both the sides in the direction along the rotational axis of the fixing film. For example, when the fluorine resin is PFA, the temperature of the heat treatment of the region corresponding to the edge region is preferably 100 to 250° C., more preferably 120 to 200° C., and further preferably 140 to 170° C.

Further, the central region with a length of 0.70 L of the central part in the direction along the rotational axis present between the regions each up to 0.15 L from both the edges of the fixing film is preferably heated to a temperature equal to or higher than the melting temperature of the fluorine resin, to be heat treated. For example, when the fluorine resin is PFA, the temperature of the heat treatment is preferably 280 to 400° C., more preferably 300 to 350° C., and further preferably 310 to 330° C.

The heating time may only be a time such that the temperature of the release layer can sufficiently reach a desirable temperature. Mention may be made of, for example, 1 to 20 minutes, 1 to 10 minutes, and 2 to 5 minutes.

In the present disclosure, X represents the value (Ic/Ia) of the ratio of the maximum X-ray diffraction strength Ic at $2\theta$=17 to 19° to the maximum X-ray diffraction strength Ia at $2\theta$=39.5 to 40.5° by the reflection X-ray diffraction method of the release layer.

Figure 5:
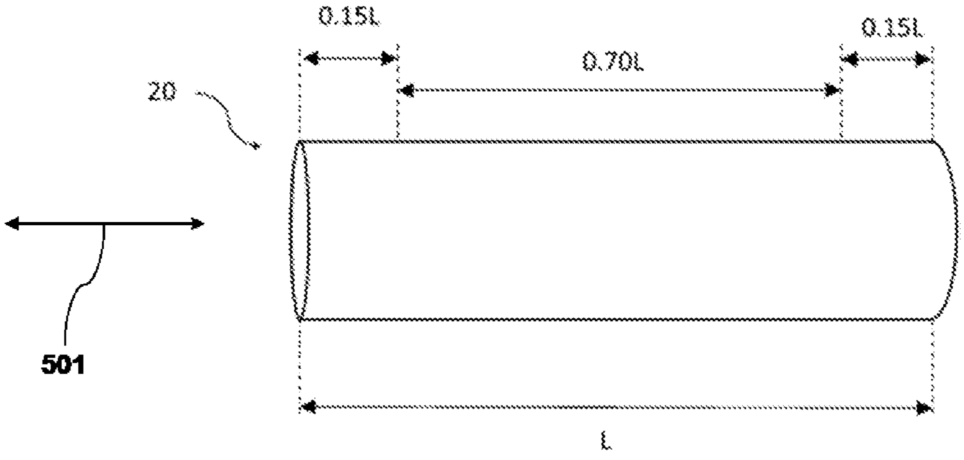
FIG. 5 is a schematic view showing a measurement segment by the reflection X-ray diffraction method.

Further, L represents the length in the direction along the rotational axis of the fixing film, Xe represents the average value of the values of X in the edge region with a length of up to 0.15 L from the edge on each opposite side in the direction 501 along the rotational axis of the fixing film, and Xm represents the average value of the values of X in the central region with a length of 0.70 L of the central part in the direction along the rotational axis present between the edge regions each with a length of up to 0.15 L from the edge on each opposite side of the fixing film (FIG. 5). At this step, the value (Xe/Xm) of the ratio of Xe to Xm is 1.20 or more.

As described previously, a value of Xe/Xm being 1.20 or more indicates that the crystallinity associated with the molecular orientation upon extrusion is higher in the edge regions than in the central region of the release layer. A value of Xe/Xm being 1.20 or more means that the orientation crystallinity of each edge region is higher than that of the central region. Namely, in the edge region, the orientation of the molecules of a fluorine resin in the direction along the rotational axis due to cylindrical extrusion is kept better. For this reason, the edge region is considered to be less likely to be worn even when coming in contact with the edge (edge part) of the sheet. Further, by setting the value of Xe/Xm at 1.20 or more, the orientation of the central part, namely, the region through which the sheet carrying a toner passes is relatively lower. Namely, in the central region in one fluorine resin tube, the molecular orientation of the fluorine resin in the direction along the rotational axis due to cylindrical extrusion is relaxed or eliminated. The heat transmitted from the heater in contact with the inner circumferential surface of the fixing film tends to be transmitted in the orientation direction of the molecules of the fluorine resin. For this reason, in the central region where the orientation in the direction along the rotational axis of the fluorine resin is relaxed or eliminated, the heat is less likely to be transmitted in the direction of the rotational axis, and tends to be transmitted in the thickness direction. As a result, in the central region, the heating efficiency of the unfixed toner on paper is improved, and the energy saving performance is improved. Furthermore, the crystallinity of the fluorine resin is low, and hence the flexibility is also improved, so that the occurrence of cracks can be suppressed.

The value of Xe/Xm is preferably 1.20 to 5.00, and more preferably 1.23 to 4.20. Alternatively, the value of Xe/Xm may be 1.25 to 2.00.

The value of Xe/Xm can be increased by heat treating the central part of the fixing film covered with a PFA tube with a high orientation crystallinity upon extrusion to a temperature equal to, or higher than the melting point of PFA.

Further, the value of Xe/Xm can be reduced by not performing a heat treatment, reducing the difference in heating temperature between at the central part and at each edge for the heat treatment, or other procedures.

Xe preferably falls within the range of, for example, 35.0 to 62.0, in particular preferably falls within the range of 37.0 to 50.0, and further preferably falls within the range of 37.0 or more and less than 50.0.

Xm preferably falls within the range of 10.0 to 35.0, in particular preferably falls within the range of 10.0 to 31.0, and is further preferably 10.0 or more and less than 31.0.

Each value of Xe and Xm falling within the foregoing ranges can control the in-plane orientation of the crystal small, and facilitates control of tearing of the release layer in endurable use.

Xe can be made larger by raising the orientation at the time of extrusion of the PFA tube. Whereas, Xe can be made smaller by reducing the orientation at the time of extrusion.

Xm can be made larger by raising the orientation at the time of extrusion of the PFA tube as with Xe. Further, Xm can be made smaller by heat treating the central part of the fixing film to a temperature equal to or higher than the melting point of the PFA.

In accordance with at least one aspect of the present disclosure, it is possible to obtain a fixing film including a surface layer exhibiting the tear resistance in the direction along the rotational axis, and the wear resistance of the edge region on each opposite side in the direction along the rotational axis at a higher level even by long-term use. Further, in accordance with at least one aspect of the present disclosure, it is possible to obtain a heat fixing apparatus contributing to the stable formation of a high quality electrophotographic image. Still further, in accordance with at least one aspect of the present disclosure, it is possible to obtain an electrophotographic image forming apparatus capable of stably forming a high quality electrophotographic image. Furthermore, in accordance with at least one aspect of the present disclosure, it is possible to obtain a manufacturing method of a fixing film including a surface layer exhibiting the tear resistance in the direction along the rotational axis, and the wear resistance of the edge region on each opposite side in the direction along the rotational axis at a higher level even by long-term use.

EXAMPLES

Below, the present disclosure will be described by reference to Examples and Comparative Examples described later. However, the present disclosure should not be construed as being limited by the Examples.

First, the physical property evaluation method will be described. Measurement of Crystallinity of Release Layer: Reflection X-Ray Diffraction Method Degrees of crystallinity of fluorine resin at central region and edge regions of release layer including fluorine resin tube Evaluation of the orientation of the release layer 24 was performed by measuring the X-ray diffraction pattern from a sample by the reflection method and the diffraction strength thereof using an X-ray diffraction device. The measurement conditions for X-ray diffraction were set as follows.

X-ray diffraction device: MiniFlex 600 (manufactured by RIGAKU Corporation)

Tube voltage/current output: 40 kV/15 mA

X radiation source: CuKα (0.154184 nm)

Kβ filter: Ni filter

Scanning axis: θ/2θ interlocked

2θ scanning region: 3° to 60°

θ/2θ axis step angle: 0.02° (2θ)

Figure 4:
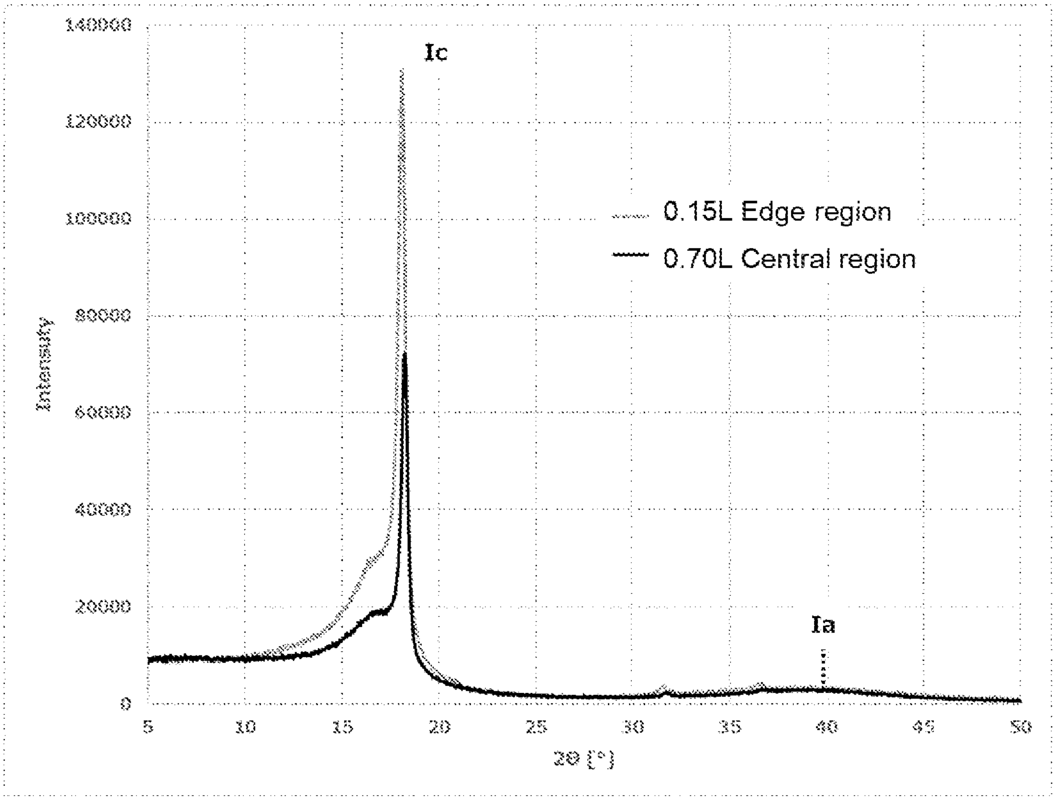
FIG. 4 shows one example of the X-ray diffraction pattern of a fluorine resin release layer in accordance with the present embodiment

FIG. 4 is one example of the X-ray diffraction pattern obtained by the measurement. Ic represents the maximum X-ray diffraction strength of the diffraction peaks of the α type crystal (100) plane appearing at 2θ=17 to 19°. Further, Ia represents the maximum strength of the broad amorphous halo peak appearing at 2θ=30 to 50° (the maximum X-ray diffraction strength at 2θ=39.5 to 40.5°). Then, X=Ic/Ia of the ratio thereof was assumed to be the index for the crystallinity and the orientation. Incidentally, for Ic and Ia, the value obtained by deducting the X-ray diffraction strength at 2θ=59 to 60° as the reference was used in order to eliminate the influence from the base line.

Further, the X-ray diffraction measurement of the release layer 24 was performed every 10 mm in length in the direction along the rotational axis of the fixing film, thereby calculating X at each measurement position. Incidentally, 4-point measurement positions were evenly provided in the circumferential direction at respective positions every 10 mm in the length in the direction along the rotational axis.

As shown in FIG. 5, Xe represents the average value of the values of X in the region (edge region) with a length of 0.15 L from each opposite end in the direction along the rotational axis where L represents the length in the direction along the rotational axis of the fixing film 20. Whereas, Xm represents the average value of the values of X in the central region with a length of 0.70 L at the central part in the direction along the rotational axis sandwiched between the edge regions with a length of 0.15 L from the edges on both sides in the direction of the rotational axis.

Then, the evaluation method of the fixing film will be described.

Durability Evaluation

Wear Resistance of Edge Region

The durability evaluation of the fixing film 20 was performed using the film heating system fixing apparatus 10 shown in FIG. 2 including each fixing film of Examples and Comparative Examples mounted therein. With the pressurizing force set at 156.8 N on one end side, and the total pressurizing force set at 313.6 N (32 kgf), rotational driving was caused so that the moving speed (peripheral speed) of the pressure roller surface may become 320 mm/sec. Thus, with the paper feeding part surface temperature of the fixing film being temperature-controlled to 170° C., 500,000 A4-sized paper sheets (trade name: GF-0068; manufactured by CANON Corporation) was fed continuously in the transverse direction at a speed of 70 sheets per minute. The portions of the edge regions of the fixing film after feeding 500,000 paper sheets with which the edge part of the paper came in contact were visually observed, and the wear resistance of each edge region was evaluated on the basis of the following criteria.

Rank A: Trace of contact of the edge part of the paper is not observed.

Rank B: Trace of contact of the edge part of the paper is observed.

Rank C: Disappearance of the surface layer is observed in a part of the contact part of the edge part of the paper.

Tear Resistance of Central Region

The same fixing apparatus as the fixing apparatus used for the evaluation of the wear resistance of the edge region was separately prepared. Then, the fixing apparatus was mounted on an electrophotographic image forming apparatus (trade name: imageRUNNER ADVANCE DX C5870F; manufactured by CANON Corporation). Then, 500,000 A4-sized paper sheets (trade name: GF-0068; manufactured by CANON Corporation) were fed continuously in the transverse direction at a speed of 70 sheets per minute. Then, one coated paper (trade name: OK Top Coat 128 g/m$^2$; manufactured by Oji Paper Co., Ltd., SRA3 size (320 mm×450 mm) was fed every time 100,000 A4-sized paper sheets had been fed, thereby forming a black lattice image on the entire surface of the coated paper. Then, the resulting five black lattice images were visually observed, and were evaluated on the basis of the following criteria.

Rank A: a flaw or a sharp streak caused by tearing of the release layer in the direction along the rotational axis of the fixing film (PFA tube extrusion direction) was not observed on the black lattice image.

Rank B: a flaw or a sharp streak caused by tearing of the release layer in the direction along the rotational axis of the fixing film (PFA tube extrusion direction) was observed on the black lattice image.

Energy Saving Performance Evaluation

The same fixing apparatus as the fixing apparatus used for the evaluation of the wear resistance of the edge region was separately prepared. The fixing apparatus was mounted on an electrophotographic image forming apparatus (trade name: imageRUNNER ADVANCE DX C5870F; manufactured by CANON Corporation), and under environment of a temperature of 10° C. and a relative humidity of 50%, the paper feeding part surface temperature of the fixing film was temperature-controlled to 170° C. Using the electrophotographic image forming apparatus, a black lattice image was formed on the entire surface of the A4-sized paper (trade name: GF-0068; manufactured by CANON Corporation). 500,000 A4-sized paper sheets were fed continuously in the transverse direction at a speed of 70 sheets per minute. Then, evaluation was performed on the basis of the following criteria. Herein, for comparison of the power reduction rate in the present evaluation, Comparative Example 1 was assumed to be the reference for Example 1. Comparative Example 2 was assumed to be the reference for Example 2. Comparative Example 3 was assumed to be the reference for Example 3. Comparative Example 4 was assumed to be the reference for Example 4. Comparative Example 5 was assumed to be the reference for Example 5. Further, Comparative Example 1 was assumed to be the reference for Comparative Example 7. For this reason, in the item of the energy saving performance evaluation in Table 1, "-" is described for Comparative Examples 1 to 5. Also, "-" is described for Comparative Examples 6 because the evaluation of the energy saving performance was not conducted on Comparative Example 6.

As the electric power, the power applied to the heater to maintain the surface temperature of the paper feeding part of the fixing film at 170° C. was measured.

Rank A: the power reduction rate is 5% or more as compared with the fixing apparatus in accordance with Comparative Example adopting the same PFA kind and thickness for the release layer.

Rank B: the power reduction rate is 1% or more and less than 5% as compared with the fixing apparatus in accordance with Comparative Example adopting the same PFA kind and thickness for the release layer.

Subsequently, Examples and Comparative Examples will be specifically described.

Example 1

Base Material

A SUS with an internal diameter of 24 mm and a thickness of 30 μm was used as the base material.

Formation of Inner Surface Sliding Layer

First, aromatic tetracarboxylic acid dianhydride or a derivative (3,3',4,4'-biphenyl tetracarboxylic acid dianhydride) and aromatic diamine (paraphenylene diamine) were allowed to react with each other in equimolar amounts in an aprotic polar organic solvent (N-methyl-2-pyrrolidone), resulting in a polyimide precursor solution. The resulting polyimide precursor solution was coated on the inner circumferential surface of the base material by the ring coating method, and was heated to 150° C. in an electric furnace. Thus, after drying the solvent, heating was performed at 200° C. for 30 minutes, and heating was further performed at 350° C. for 30 minutes, so that the polyimide precursor was imidized, thereby forming an inner surface sliding layer. The thickness of the inner surface sliding layer was set at 12 μm.

Formation of Primer Layer and Elastic Layer

For the base material on which the inner surface sliding layer was formed, the primer layer and the elastic layer were formed in the following procedure.

Onto the base material, a hydrosilyl type silicone primer (DY39-051 A/B (trade name); manufactured by DOW and TORAY Co.) was coated, and heated and cured at 200° C. for 5 minutes. On the primer layer, alumina-containing addition reaction type liquid silicone rubber (DY35-1310 A/B) was coated as a thermally conductive filler, and was heated and cured at 200° C. for 30 minutes, thereby forming a silicone rubber elastic layer.

The thermal conductivity of the elastic layer 22 was 1.0 W/mK, and the thickness thereof was 250 μm.

Coating of Adhesive Layer

After forming the elastic layer, on the elastic layer, an adhesive (SE1819CV A/B (trade name); manufactured by DOW and TORAY Co.) was coated with a thickness of 7 μm using the ring coating method.

Formation of Release Layer

After coating the adhesive, as the release layer, a PFA tube was allowed to cover the top of the adhesive by the method of covering by external vacuum extension (vacuum extension covering method). Specifically, a PFA tube was adsorbed in a vacuum state on the inner surface of the outer cylinder having a larger inner diameter than the outer diameter of a work after formation of the elastic layer coated with the adhesive for diameter extension, and the work was inserted thereinto, followed by release of vacuum. As a result, the PFA tube was allowed to cover the top of the adhesive. The extra adhesive and air between the PFA tube and the elastic layer were squeezed out by an O ring, and then, were heated in an electric furnace, thereby curing and bonding the adhesive. Subsequently, both the edges were each cut to a prescribed length, resulting in a fixing film.

Incidentally, for the release layer of the fixing film, a PFA tube with a thickness of 20 μm and an inner diameter of 23.0 mm manufactured by extruding a PFA (trade name: NEOFLON PFA AP-231SH; manufactured by DAIKIN INDUSTRIES Ltd.) as a raw material from a cylindrical die was used. Incidentally, the length L in the longitudinal direction of the tube was 400 mm. Further, the average value of the values of X measured at respective positions every 10 mm from one edge toward the other edge in the longitudinal direction of the tube was 34.9. Further, in the fixing film with this tube attached, the average value of the values of X of the release layer (before heat treatment) measured at respective positions every 10 mm from one edge toward the other edge in the longitudinal direction of the fixing film was 38.4. The reason why the value of X is larger than that of the tube is thought to be that the crystalline state of the tube (releasing layer) became higher by expanding the diameter of the tube and putting it on the adhesive layer.

Heat Treatment of Release Layer

The fixing film covered with the PFA tube as the release layer was inserted into a heating cylinder with a larger inner diameter than the outer diameter thereof, and the fixing film was heated. At this step, only the central region with a length in the direction along the rotational axis of the fixing film of 0.70 L where L represents the length in the direction along the rotational axis of the fixing film was subjected to a heat treatment by a band heater in the heating cylinder inside corresponding to the length. The heating control temperature was set at 320° C., and heating was controlled so that the body temperature of the release layer may become equal to, or higher than the melting temperature of PFA of 305° C.

On the other hand, both the edge regions of the fixing film were heated and controlled at a temperature of not exceeding the melting temperature of PFA of 150° C.

The heating time was set at 3 minutes after charging the fixing film into the heating cylinder as the time enough for allowing the body temperature of the release layer to reach the prescribed temperature. After an elapse of 3 minutes from charging, the fixing film was taken out from the heating cylinder to under normal temperature atmosphere, and the release layer was cooled, and crystallized.

The release layer was isolated from the fixing film subjected to the heat treatment. Specifically, the surface layer was removed together with the elastic layer from the base material. Thus, the elastic layer bonded with the surface layer was dissolved using a silicone resolvent (trade name: e SOLVE 21RS; manufactured by KANEKO CHEMICAL Co.), thereby taking out only the release layer having an endless shape.

Using the resulting release layer, for the surface corresponding to the outer surface of the fixing film, X=Ic/Ia was measured with the reflection X-ray diffraction method described previously. Specifically, for the edge region with a length of up to 0.15 L from the edge on each opposite side in the direction orthogonal to the circumferential direction (the direction along the axis) of the release layer, the values of X at positions every 10 mm were measured, and the average value Xe thereof was calculated. Further, for the central region situated between the edge regions, the values of X at positions every 10 mm were measured from one end toward the other end, and the average value Xm thereof was calculated. The values of Xe, Xm, and Xe/Xm are described in Table 1.

Example 2

Using the same raw materials as those for the PFA tube in accordance with Example 1, a PFA tube with a thickness of 15 μm was prepared. The average value of the values of X measured at respective positions every 10 mm from one edge toward the other edge in the longitudinal direction of the tube was 38.4. A fixing film and a release layer thereof were obtained in the same manner as in Example 1, except for using the PFA tube. The average value of the values of X of the release layer before heat treatment was 41.6.

Example 3

Using the same raw materials as those for the PFA tube in accordance with Example 1, a PFA tube with a thickness of 25 μm was prepared. The average value of the values of X measured at respective positions every 10 mm from one edge toward the other edge in the longitudinal direction of the tube was 31.7. A fixing film and a release layer thereof were obtained in the same manner as in Example 1, except for using the PFA tube. The average value of the values of X of the release layer before heat treatment was 37.5.

Example 4

As the raw material, PFA (trade name: Teflon PFA 959HPPlus; manufactured by Chemours-Mitsui Co.) was extruded from a cylindrical die, thereby preparing a PFA tube with a thickness of 20 μm, and an internal diameter of 23.0 mm. The length L in the direction orthogonal to the circumferential direction of the tube was 400 mm. Further, the average value of the values of X measured at respective positions every 10 mm from one edge toward the other edge in the longitudinal direction of the tube was 58.7.

A fixing film and a release layer thereof were obtained in the same manner as in Example 1, except for using the PFA tube. The average value of the values of X of the release layer before heat treatment was 60.5.

Example 5

Using the same raw materials as those for the PFA tube in accordance with Example 4, a PFA tube with a thickness of 40 μm was prepared. The average value of the values of X measured at respective positions every 10 mm from one edge toward the other edge in the longitudinal direction of the tube was 41.1. A fixing film and a release layer thereof were obtained in the same manner as in Example 4, except for using the PFA tube. The average value of the values of X of the release layer before heat treatment was 44.1.

Comparative Example 1

A fixing film was manufactured in the same manner as in Example 1, except for not performing a heat treatment. The values of Xe and Xm of the release layer were obtained by the same reflection X-ray diffraction method as that of Example. Further, Xe/Xm was calculated from the values.

Comparative Example 2

A fixing film was manufactured in the same manner as in Example 2, except for not performing a heat treatment. The values of Xe and Xm of the release layer were obtained by the same reflection X-ray diffraction method as that of Example. Further, Xe/Xm was calculated from the values.

Comparative Example 3

A fixing film was manufactured in the same manner as in Example 3, except for not performing a heat treatment. The values of Xe and Xm of the release layer were obtained by the same reflection X-ray diffraction method as that of Example. Further, Xe/Xm was calculated from the values.

Comparative Example 4

A fixing film was manufactured in the same manner as in Example 4, except for not performing a heat treatment. The values of Xe and Xm of the release layer were obtained by the same reflection X-ray diffraction method as that of Example. Further, Xe/Xm was calculated from the values.

Comparative Example 5

A fixing film was manufactured in the same manner as in Example 5, except for not performing a heat treatment. The values of Xe and Xm of the release layer were obtained by the same reflection X-ray diffraction method as that of Example. Further, Xe/Xm was calculated from the values.

Comparative Example 6

A PFA tube with a thickness of 20 μm was prepared in the same manner as in Example 1, except for using "Algoflon PFA: F1520 (trade name: manufactured by Solvay Japan Co.)" as PFA. The average value of the values of X measured at respective positions every 10 mm from one edge toward the other edge in the longitudinal direction of the tube was 53.5.

Then, a fixing film was obtained in the same manner as in Example 1, except for using the PFA tube, and not performing a heat treatment. The values of Xe and Xm of the release layer were obtained by the same reflection X-ray diffraction method as that of Example. Further, Xe/Xm was calculated from the values.

Comparative Example 7

A fixing film was manufactured in the same manner as in Example 1, except for performing the heat treatment of the release layer in the following manner. For the release layer isolated from the resulting fixing film, the values of Xe and Xm were obtained with the same reflection X-ray diffraction method as that in Example. Further, Xe/Xm was calculated from the values.

Heat Treatment

The heating cylinder used in Example 1 was used. However, heating was performed for 3 minutes with the heating control temperature set at 320° C. higher than the melting temperature of PFA in the entire region in the direction along the rotational axis of the fixing film. After heating, the fixing film was taken out from the heating cylinder, and was placed under normal temperature atmosphere, thereby crystallizing the PFA of the release layer.

TABLE 1

| | | Thickness (μm) | PFA Kind | X = Ic/Ia Xe | Xm | Xe/Xm | Energy saving performance | Wear resistance | Tear resistance |
|---|---|---|---|---|---|---|---|---|---|
| | | | | | | | Evaluation rank | | |
| Example | 1 | 20 | AP-231SH | 38.4 | 30.6 | 1.25 | B | B | A |
| | 2 | 15 | AP-231SH | 41.6 | 33.2 | 1.25 | A | B | A |
| | 3 | 25 | AP-231SH | 37.5 | 23.0 | 1.63 | B | B | A |
| | 4 | 20 | 959HP Plus | 60.5 | 24.9 | 2.43 | B | A | A |
| | 5 | 40 | 959HP Plus | 44.1 | 10.6 | 4.16 | B | A | A |
| Comparative Example | 1 | 20 | AP-231SH | 38.4 | 38.4 | 1.00 | — | B | A |
| | 2 | 15 | AP-231SH | 41.6 | 41.6 | 1.00 | — | B | A |
| | 3 | 25 | AP-231SH | 37.5 | 37.5 | 1.00 | — | B | A |
| | 4 | 20 | 959HP Plus | 60.5 | 60.5 | 1.00 | — | A | B |
| | 5 | 40 | 959HP Plus | 44.1 | 44.1 | 1.00 | — | B | A |
| | 6 | 20 | F1520 | 56.0 | 56.0 | 1.00 | — | B | B |
| | 7 | 20 | AP-231SH | 30.2 | 30.2 | 1.80 | B | C | A |

As shown in the Examples 1 to 5, with the fixing film in accordance with one aspect of the present disclosure, the average value Xe of the values of X of the release layer in each edge region is made 1.20 times or more as large as the average value Xm of the values of X in the central region. This can provide a fixing film which is favorable in energy saving performance while preventing the edge region to come in contact with the edge part of paper from being worn, and capable of preventing tear in the direction along the axis of the release layer in the central region.

The fixing film in accordance with Comparative Example 7 was more favorable in energy saving performance as compared with the fixing film in accordance with Comparative Example 1. However, X was smaller than X of the fixing belt in accordance with Comparative Example 1 over the entire region in the direction along the rotational axis of the fixing film. For this reason, in the edge region, wear due to contact with the edge of paper was caused, so that enough durability could not be kept.

Further, each fixing film in accordance with Comparative Example 4 and Comparative Example 6 has large values of Xe and Xm, namely, is large in in-plane orientation of the crystal. For this reason, tear of the release layer is caused in endurable use.

Up to this point, the embodiments in accordance with the present disclosure were described. However, the present disclosure should not be construed as being limited to the foregoing aspect.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-099830, filed Jun. 21, 2022, and Japanese Patent Application No. 2023-096734, filed Jun. 13, 2023, which are hereby incorporated by reference herein in their entirety.

What is claimed is:

1. A fixing film having an endless shape, comprising: at least a base material, an elastic layer, and a release layer in this order, the release layer comprising a tube containing a fluorine resin, a value of Xe/Xm is 1.20 or more, where when, in a chart of an X-ray diffraction peaks obtained by measuring the release layer with a reflection X-ray diffraction method, a maximum X-ray diffraction strength at 2θ=17 to 19° is defined as Ic, a maximum X-ray diffraction strength at 2θ=39.5 to 40.5° is defined as Ia, and a value of Ic/Ia is defined as X, and a length in a direction along a rotational axis of the fixing film is defined as L, Xe represents an average value of X in an edge region up to 0.15 L from each opposite edge in the direction along the rotational axis of the fixing film, and Xm represents an average value of X in a central region with a length in the direction along the rotational axis of 0.70 L present between the two edge regions.

2. The fixing film according to claim 1, wherein Xe/Xm is 1.20 to 5.00.

3. The fixing film according to claim 1, wherein Xe/Xm is 1.23 to 4.20.

4. The fixing film according to claim 1, wherein Xe/Xm is 1.25 to 2.00.

5. The fixing film according to claim 1, wherein Xe is 35.0 to 62.0.

6. The fixing film according to claim 1, wherein Xe is 37.0 to 50.0.

7. The fixing film according to claim 1, wherein Xe is 37.0 or more and less than 50.0.

8. The fixing film according to claim 1, wherein Xm is 10.0 to 35.0.

9. The fixing film according to claim 1, wherein the tube is a cylindrically extruded product.

10. The fixing film according to claim 1, wherein the fluorine resin is a copolymer of tetrafluoroethylene and perfluoroalkyl vinyl ether.

11. The fixing film according to claim 1, wherein the tube is a cylindrically extruded product of a resin mixture comprising a copolymer of tetrafluoroethylene and perfluoroalkyl vinyl ether.

12. The fixing film according to claim 1, wherein the release layer has a thickness of 10 to 45 μm.

13. A heat fixing apparatus comprising a fixing film, wherein the fixing film has an endless shape, and comprises at least a base material, an elastic layer, and a release layer in this order, the release layer comprises a tube containing a fluorine resin, and a value of Xe/Xm is 1.20 or more, where when, in a chart of an X-ray diffraction peaks obtained by measuring the release layer with a reflection X-ray diffraction method, a maximum X-ray diffraction strength at 2θ=17 to 19° is defined as Ic, a maximum X-ray diffraction strength at 2θ=39.5 to 40.5° is defined as Ia, and a value of Ic/Ia is defined as X, and a length in a direction along a rotational axis of the fixing film is defined as L, Xe represents an average value of X in an edge region up to 0.15 L from each opposite edge in the direction along the rotational axis of the fixing film, and Xm represents an average value of X in a central region with a length in the direction along the rotational axis of 0.70 L present between the two edge regions.

14. The heat fixing apparatus according to claim 13, further comprising a heater, the heater being arranged so as to be in contact with an inner circumferential surface of the fixing film.

15. The heat fixing apparatus according to claim 14, further comprising a pressure roller, wherein the pressure roller and the heater are in pressure contact with each other with the fixing film interposed therebetween.

16. An electrophotographic image forming apparatus comprising a heat fixing apparatus, wherein the heat fixing apparatus comprises a fixing film, the fixing film has an endless shape, and comprise at least a base material, an elastic layer, and a release layer in this order, the release layer comprises a tube containing a fluorine resin, and wherein a value of Xe/Xm is 1.20 or more, where when in a chart of an X-ray diffraction peaks obtained by measuring the release layer with a reflection X-ray diffraction method, a maximum X-ray diffraction strength at 2θ=17 to 19° is defined as Ic, a maximum X-ray diffraction strength at 2θ=39.5 to 40.5° is defined as Ia, and a value of Ic/Ia is defined as X, and a length in a direction along a rotational axis of the fixing film is defined as L, Xe represents an average value of the X in an edge region up to 0.15 L from each opposite edge in the direction along the rotational axis of the fixing film, and Xm represents an average value of the X in a central region with a length in the direction along the rotational axis of 0.70 L present between the two edge regions.

17. The electrophotographic image forming apparatus according to claim 16, wherein the heat fixing apparatus further comprises a heater, and the heater is arranged so as to be in contact with an inner circumferential surface of the fixing film.

18. The electrophotographic image forming apparatus according to claim 17, wherein the heat fixing apparatus further comprises a pressure roller, and the pressure roller and the heater are in pressure contact with each other with the fixing film interposed therebetween.

* * * * *